United States Patent [19]

Priest

[11] Patent Number: 5,491,668
[45] Date of Patent: Feb. 13, 1996

[54] METHOD FOR DETERMINING THE THICKNESS OF A CASING IN A WELLBORE BY SIGNAL PROCESSING PULSE-ECHO DATA FROM AN ACOUSTIC PULSE-ECHO IMAGING TOOL

[75] Inventor: John F. Priest, Tomball, Tex.

[73] Assignee: Western Atlas International, Inc., Houston, Tex.

[21] Appl. No.: 242,118

[22] Filed: May 13, 1994

[51] Int. Cl.[6] ................................................ G01V 1/40
[52] U.S. Cl. ............................ 367/35; 367/28; 181/105
[58] Field of Search ............................... 367/35, 32, 28; 181/105

[56] References Cited

U.S. PATENT DOCUMENTS

| | | | |
|---|---|---|---|
| 3,340,953 | 9/1967 | Zemanek, Jr. | 367/28 |
| 4,255,798 | 3/1981 | Havira | 367/35 |
| 4,685,092 | 8/1987 | Dumont | 367/35 |
| 4,709,357 | 11/1987 | Maki, Jr. | 367/35 |
| 4,733,380 | 3/1988 | Havira | 367/35 |
| 4,802,145 | 1/1989 | Mount, II | 367/35 |
| 4,912,683 | 3/1990 | Katahara et al. | 181/105 |
| 4,928,269 | 5/1990 | Kimball et al. | 181/105 |
| 5,146,432 | 9/1992 | Kimball et al. | 367/35 |
| 5,216,638 | 6/1993 | Wright | 367/35 |
| 5,274,604 | 12/1993 | D'Angelo et al. | 367/35 |

OTHER PUBLICATIONS

Casing Evaluation Services, Atlas Wireline Services brochure, 1985.
Digital Circumferential Borehole Imaging Log (CBIL), Atlas Wireline Services brochure, 1993.
UltraSonic Imager, Schlumberger Wireline & Testing brochure.

*Primary Examiner*—Charles T. Jordan
*Assistant Examiner*—Theresa M. Wesson
*Attorney, Agent, or Firm*—Richard A. Fagin

[57] ABSTRACT

The invention is a method of determining the thickness of a casing in a wellbore penetrating an earth formation using group delay determined casing resonance extracted from processed reflection signals from an acoustic pulse-echo imaging tool. A first Fourier transform coefficient series is calculated from the digitized reflection signal. Individual samples of the reflection signal are multiplied by their sample index values to obtain a modified digitized data string. A second Fourier transform coefficient series is calculated from the modified digitized data. The complex group delay function is calculated directly from the first and second Fourier coefficient series.

4 Claims, 5 Drawing Sheets

METHOD FOR DETERMINING THE THICKNESS OF A CASING IN A WELLBORE BY SIGNAL PROCESSING PULSE-ECHO DATA FROM AN ACOUSTIC PULSE-ECHO IMAGING TOOL

BACKGROUND OF THE INVENTION

1. Field of the Invention

The present invention is related to the field of servicing wellbores with electric wireline tools. More specifically, the present invention is related to the use of acoustic pulse-echo imaging tools, which are commonly run on electric wireline or cable in wellbores in an openhole, or portion of the wellbore which is not equipped with protective pipe or casing. Acoustic pulse-echo imaging tools are commonly run in the open-hole for constructing a graphic representation of acoustic reflection properties, and acoustic travel times from the tool exterior to the wellbore wall. The graphic representation approximates a visual image of the wellbore wall.

2. Description of the Related Art

Acoustic pulse-echo imaging tools are known in the art. For example, "The Digital Circumferential Borehole Imaging Log—CBIL" Atlas Wireline Services, Houston, Tex. 1993, describes an acoustic pulse-echo imaging tool in detail. The acoustic pulse-echo imaging tool usually comprises a rotating head on which is mounted a piezoelectric element transducer. The transducer periodically emits an acoustic energy pulse on command from a controller circuit in the tool. After emission of the acoustic energy pulse, the transducer can be connected to a receiving circuit, generally located in the tool, for measuring a returning echo of the previously emitted acoustic pulse which is reflected off the wellbore wall. Circuitry, which can be in the tool or at the earth's surface measures the echo or reflection travel time and the reflection amplitude. The measurements of reflection time and reflection amplitude are used by circuitry at the earth's surface to generate a graph which corresponds to the visual appearance of the wellbore wall. The graph is used, for example, to measure the attitude of sedimentary features and to locate breaks or fractures in some earth formations.

Another application for electric wireline tools is measurement of the thickness of the casing. Casing, which is usually composed of steel alloy, is installed on at least a portion of most wellbores and is most commonly used for hydraulically isolating an earth formation that could be damaged or contaminated by fluids which may be produced from a different earth formation penetrated by the wellbore. Periodic measurement of the thickness of the casing is desirable for helping to determine the hydraulic integrity of the casing. Electric wireline tools are frequently used for measurement of casing thickness since the casing generally cannot be removed from the wellbore after the casing is installed. The most common types of wireline tools used for measurement of casing thickness are electromagnetic devices known as electromagnetic casing inspection tools "Casing Inspection Services", Atlas Wireline Services, Houston, Tex., 1991, describes some of the wireline tools used for casing thickness measurements. These tools generally work by passing a low frequency, usually 5–100 Hz, alternating current through a transmitter coil inside the inspection tool, and measuring, with a receiver coil also located inside the inspection tool, at least one property of the induced electromagnetic field in the casing.

Electromagnetic casing inspection tools are not very accurate for determining the absolute thickness of the casing because the casing inspection tool readings can be affected by such things as minute differences in metal composition which occur as a result of different manufacturing processes. Obtaining high accuracy measurements of casing thickness with electromagnetic casing inspection tools usually requires calibrating the electromagnetic casing inspection tool readings with a portion of known thickness of the casing being inspected. The calibration can be accomplished by first measuring the casing thickness prior to installation of the casing, with a device such as a caliper, and then performing a first run of the electromagnetic casing inspection tool immediately after installation of the casing. Calibration of measurements from an electromagnetic casing inspection tool can be difficult and expensive.

If the casing is composed of a material which does not have appropriate electrical and magnetic properties, then electromagnetic casing inspection tools cannot be used at all. For example, fiberglass reinforced plastic is used for the casing on certain wellbores adapted for solution mining. Determining casing thickness on wellbores with fiberglass reinforced plastic casing is not possible with electromagnetic casing inspection tools.

It is also known in the art to use measurements from acoustic pulse-echo imaging tools to derive the thickness of the casing. "Schlumberger Ultrasonic Borehole Imager—UBI" Schlumberger Limited, New York, 1992, describes a method of processing the reflections from an acoustic pulse-echo imaging tool to derive casing thickness. The method known in the art uses a Fast Fourier Transform (FFT) to analyze the frequency content of the acoustic energy in the reflection. Frequency content information is further analyzed to determine casing thickness. A time-varying electrical voltage is generated by the transducer in the tool as a result of the reflection. The time-varying electrical voltage is digitized in the tool to generate a first plurality of numbers, each number representing acoustic amplitude sampled at spaced-apart time intervals. The FFT processes the first plurality of numbers into a first plurality of number pairs representing amplitude as a function of frequency, and a second plurality of number pairs representing phase as a function of frequency. The method known in the art determines the resonant frequency of the casing, which is related to casing thickness, by calculating a first derivative function of the second plurality of number pairs representing phase as a function of frequency, and locating a frequency number at which a peak value of the first derivative function occurs. The method known in the art is difficult because the phase has a range of values of zero degrees to 360 degrees. If the phase values in the second plurality of number pairs reach either zero or 360 degrees, the phase values "wrap" or cross over to the other end of the phase value scale. For example, continuing from 359 degrees with a change in phase of 5 degrees per sample would provide a set of values which includes: 359, 4, 9, 14, etc. A graphic representation of the phase values resulting from a typical FFT would generally show a "saw-tooth" pattern because of the large number of crossovers that usually exists in a phase spectrum. Calculation of the first derivative function requires an additional processing step to "unwrap" the phase values into a nominally monotonic series of number pairs, whereby the crossover events are eliminated as a result of the unwrapping process. The unwrapping function is subject to significant error if the phase values do not trace a substantially smooth curve, particularly in the range of values near any of the crossovers.

It is an object of the present invention to provide a method for determining the thickness of a casing installed in a wellbore by using an acoustic pulse-echo imaging tool to derive the resonant frequency of the casing, wherein the first derivative function of the series of number pairs is calculated by an analytical process which does not require the step of unwrapping the phase values.

SUMMARY OF THE INVENTION

The invention is an improved method of determining the thickness of a casing installed in a wellbore penetrating an earth formation. The method of determining the thickness of the casing uses processed reflection signals from an acoustic wellbore imaging tool to determine the resonant frequency of the casing. The resonant frequency of the casing is related to the thickness of the casing and the velocity of sound in the casing. The resonant frequency of the casing can be determined by locating the frequency within the frequency spectrum of the reflection in which an energy loss is indicated. The frequency at which the energy loss occurs is determined by finding the frequency at which a maximum value of the group delay of the reflection occurs. The group delay is defined as the first derivative function of the phase of an energy spectrum with respect to the frequency of the energy spectrum. The improvement of the present invention is a method of calculating the group delay directly from a first Fourier transform coefficient series generated from the digitized reflection signal sample set, and from a second Fourier transform coefficient series generated from the digitized reflection signal samples each multiplied by an index value representing the ordinal position of each sample in the reflection sample set.

Particular embodiments of the present invention include the step of decimating the digitized reflection sample set, which decreases the maximum frequency calculable by the Fourier transform, and the step of zero-filling the digitized reflection sample set, which is extending the digitized reflection sample set with samples each having a value of zero. The zero-filling step improves the frequency resolution of the Fourier transform.

DESCRIPTION OF THE PREFERRED EMBODIMENT

Figure 1:
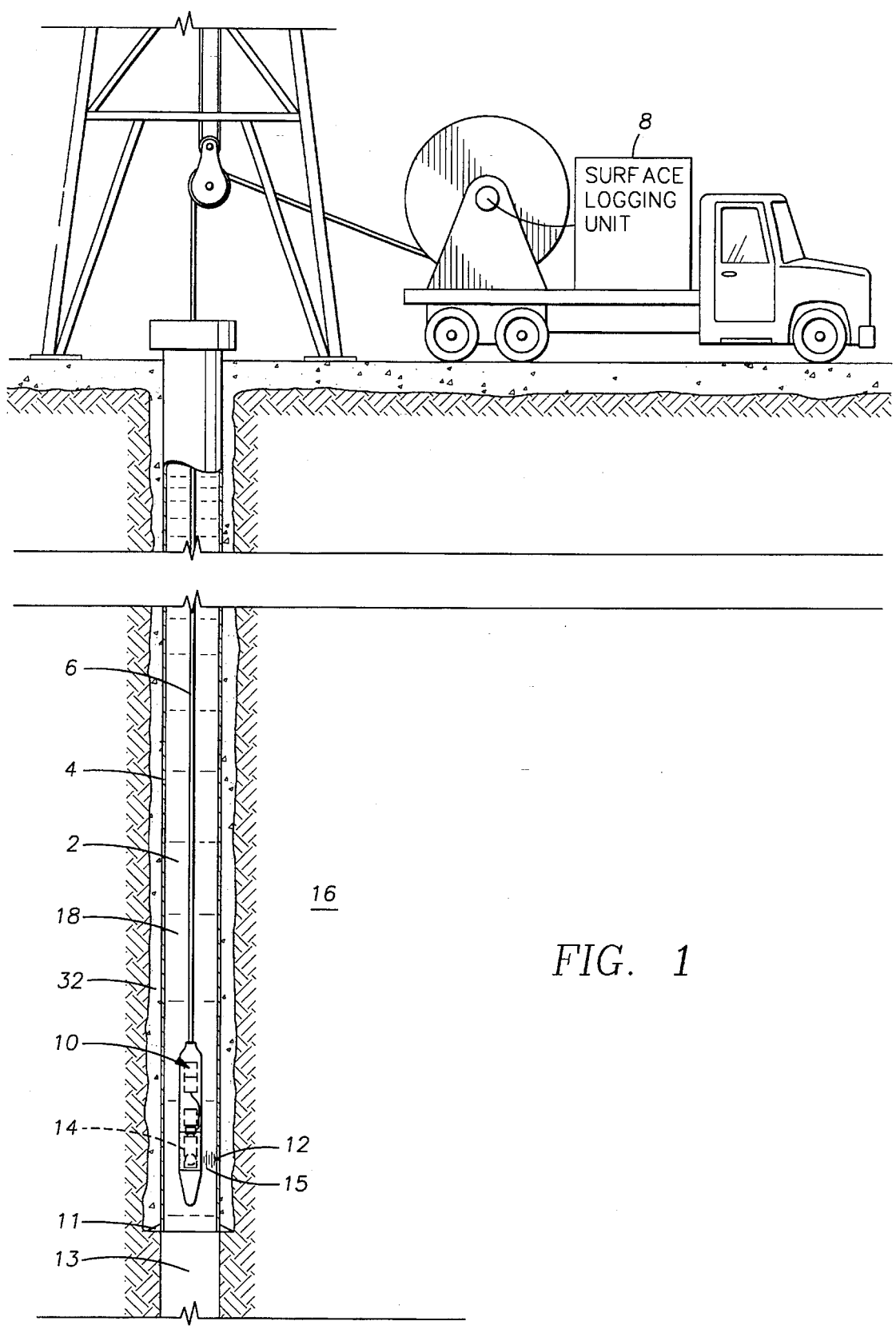
FIG. 1 depicts the acoustic pulse-echo imaging tool deployed within a wellbore.

FIG. 1 shows an acoustic pulse-echo imaging tool 10 as it is typically used in a wellbore 2. The acoustic pulse-echo imaging tool 10, called the tool for brevity, is lowered to a desired depth in the wellbore 2 by means of an electric wireline or cable 6. Power to operate the tool 10 is supplied by a surface logging unit 8 connected to the other end of the cable 6. Signals acquired by the tool 10 are transmitted through the cable 6 to the surface logging unit 8 for processing and presentation.

During the process of drilling the wellbore 2, a casing 4 is set in the wellbore 2 and cemented in place with concrete 32. At the bottom of the casing 4 is a casing shoe 11. Drilling the wellbore 2 continues after cementing of the casing 4 until a desired depth is reached. At this time, the tool 10 is typically run in an open-hole 13, which is a portion of the wellbore 2 deeper than the casing shoe 11. The tool 10 is usually run in the open-hole 13 for evaluating an earth formation 16 penetrated by the wellbore 2. Sometimes evaluation of the earth formation 16 proceeds to a depth shallower than the casing shoe 11, and continues into the part of the wellbore 2 in which the casing 4 is cemented.

The tool 10 has a transducer section 14 from which an acoustic pulse 12 is emitted. The acoustic pulse 12 travels through a liquid 18 which fills the wellbore 2. The liquid 18 may be water, water-based solution of appropriate chemicals, or drilling mud. When the acoustic pulse 12 strikes the wall of the wellbore 2, or the casing 4, at least part of the energy in the acoustic pulse 12 is reflected back toward the tool 10 as a reflection 15. The transducer section 14 is then switched to receive the reflection 15 of the acoustic pulse 12 from the wall of the wellbore 2, or from the casing 4. The reflection 15 contains data which are useful in evaluating the earth formation 16 and the casing 2.

Figure 2:
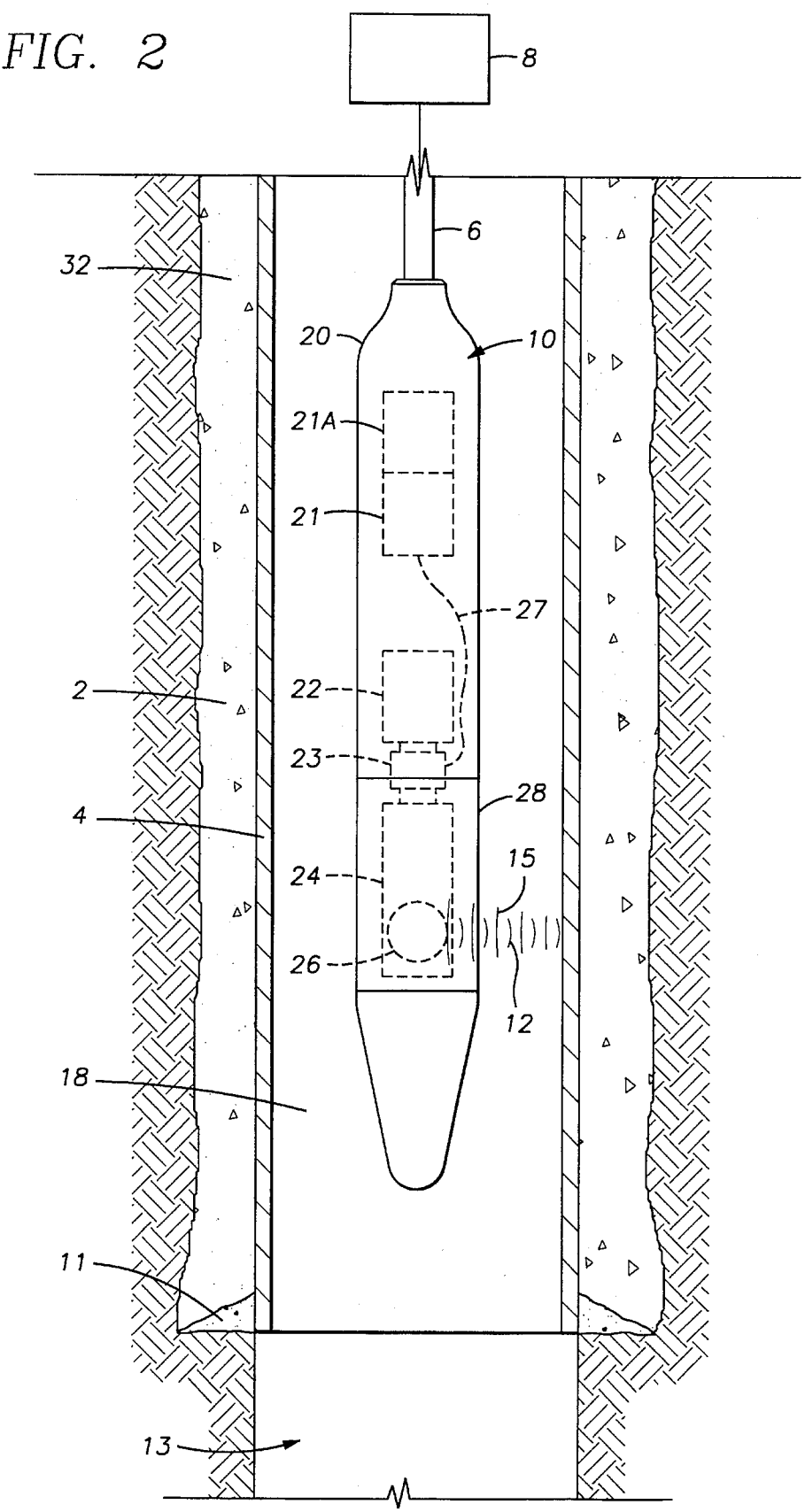
FIG. 2 shows the acoustic pulse-echo imaging tool in more detail.

FIG. 2 shows the tool 10 in more detail. The tool 10 is connected to one end of the cable 6 and comprises a housing 20 which contains a transducer head 26 rotated by an electric motor 22. Rotation of the transducer head 26 enables evaluation of substantially all the circumference of the wellbore 2 and casing 4 by enabling acoustic pulses 12 to be aimed at and reflections 15 received from various angular positions around the axis of the wellbore 2 or casing 4. The transducer head 24 is located within an acoustically transparent cell 28. The acoustic pulses 12 and the reflections 15 can easily pass through the cell 28. The acoustic pulses 12 are generated, and the reflections 15 are received by a piezoelectric element 26 contained within the transducer head. The piezoelectric element 26 is constructed with an internal focusing feature so that the emitted acoustic pulses 12 have an extremely narrow beam width, typically about ⅓ of an inch. Narrow beam width enables high resolution of small features in the wellbore 2. The piezoelectric element 26 emits the acoustic pulses 12 upon being energized by electrical impulses from a transceiver circuit 21. The electrical impulses are conducted through an electromagnetic coupling 23 which enables rotation of the transducer head 26. After transmitting the acoustic pulse 12, the transceiver circuit 21 is programmed to receive a time-varying electrical voltage 27 generated by the piezoelectric element 26 as a result of the reflections 15 striking the piezoelectric element 26. The transceiver circuit 21 also comprises an analog-to-digital converter 21A which converts the resulting time-varying electrical voltage 27 into a plurality of numbers, which may also be known as samples, representing the magnitude of the time-varying electrical voltage 27 sampled at spaced-apart time intervals. The plurality of numbers is transmitted to the surface logging unit 8 through the cable 6.

Figure 3:
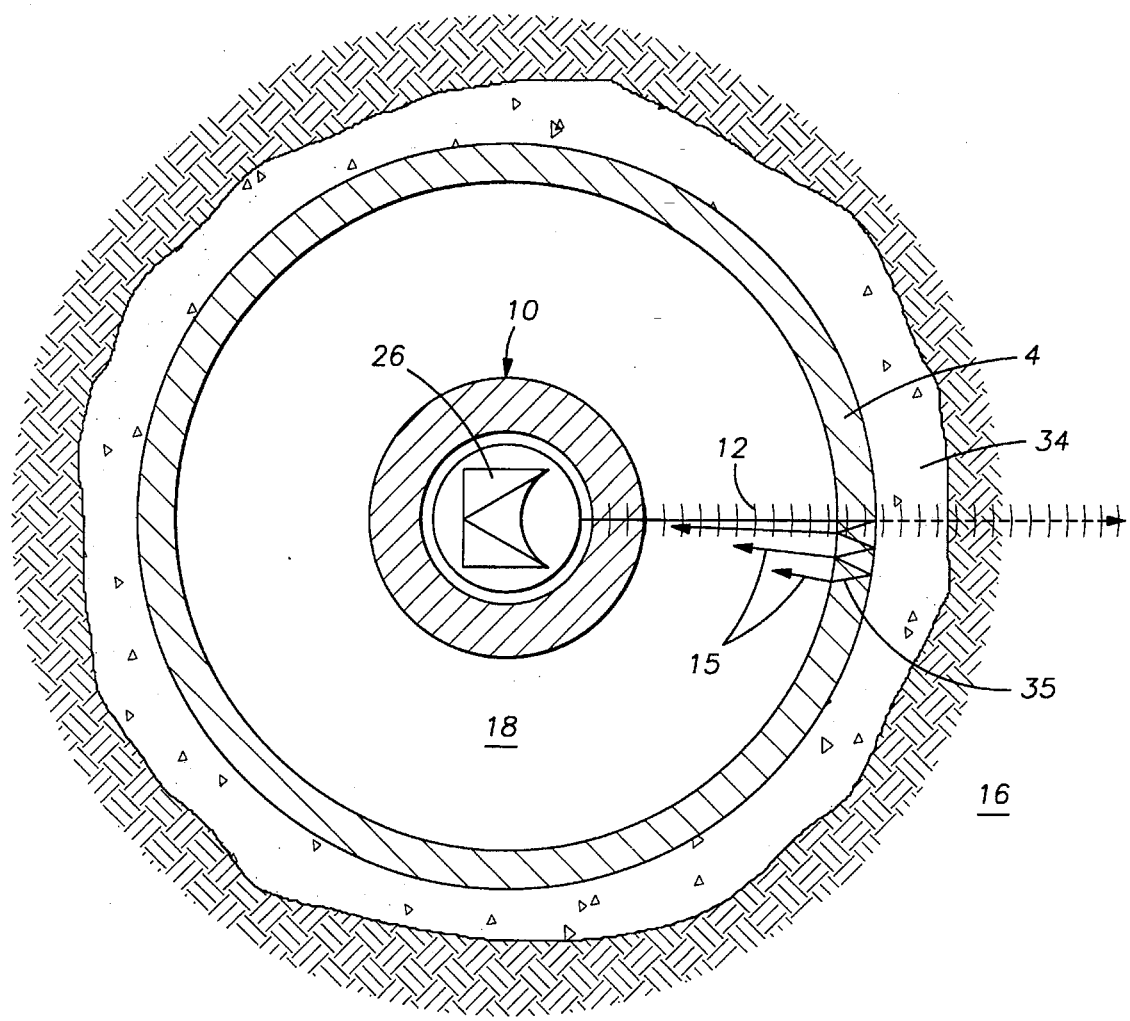
FIG. 3 shows typical acoustic energy travel paths from the tool to the wellbore wall and associated reflections.

FIG. 3 shows the principle of operation of the tool 10 in more detail as it relates to determining the thickness of the casing 4. The tool 10 is suspended substantially in the center of the wellbore 2. The acoustic pulses 12 emitted by the tool 10 travel through the fluid 18 filling the wellbore until they contact the casing. Because the acoustic velocity of the casing 4 and the fluid 18 are generally quite different, an acoustic impedance boundary is created at the interface between the casing 4 and the fluid 18. Some of the energy in the acoustic pulse 12 will be reflected back toward the tool 10. Some of the energy of the acoustic pulse 12 will travel through the casing 4 until it reaches the interface between the casing 4 and cement 34 in the annular space between the borehole 2 and the casing 4. The acoustic velocity of the cement 34 and the acoustic velocity of the casing 4 are generally different, so another acoustic impedance boundary is created. As at the fluid casing interface, some of the energy of the acoustic pulse 12 is reflected back towards the tool 10, and some of the energy travels through the cement 34. Energy reflected back towards the tool 10 from the exterior surface of the casing 4 will undergo a further partial reflection 35 when it reaches the interface between the fluid 18 in the wellbore 2 and the casing 4. The acoustic energy absorbed by the casing 4 will be greatest at the resonant frequency of the casing 4 because the wavelength of the energy at the resonance frequency is such that the partial reflections tend to become trapped in the casing. The acoustic energy detected by the tool 10 within the reflection 15 will show evidence of energy absorption at the resonant frequency of the casing 4. The resonant frequency of the casing 4 is a function of the thickness of the casing 4 and the velocity of sound in the casing 4. The velocity of sound in the casing 4 can be determined by measurement at the earth's surface, or inferred from knowledge of the material composition of the casing 4. Thickness of the casing 4 can be determined by determining the resonant frequency of the casing as indicated by analysis of the acoustic energy contained in the reflection 15. The analytical method of determining the resonant frequency of the casing 4 is as follows:

Each reflection is digitized into a first plurality of numbers. Each number of the first plurality of numbers has an index value which represents the ordinal position of each number in the first plurality of numbers. The first plurality of numbers is used to calculate a first Fast Fourier transform. The output of the first Fast Fourier transform is a first plurality of coefficient pairs representing real coefficients and imaginary coefficients of the first Fast Fourier transform. The real coefficients and the imaginary coefficients are computed by the relationships:

$$A_k = \frac{2}{N} \sum_i f_i * \cos\left(\frac{2*\pi*k*i}{N}\right) \quad (1)$$

Note: in these equations the asterisk (*) is the symbol for multiplication.

$$B_k = \frac{2}{N} \sum_i f_i * \sin\left(\frac{2*\pi*k*i}{N}\right) \quad (2)$$

where $f_i$ is a number in the first plurality of numbers, k is the wave number, N is the total quantity of numbers in the first plurality of numbers, $A_k$ and $B_k$ are, respectively the real and imaginary Fourier coefficients and i is the index value and the ordinal position of each sample in the plurality of numbers. The Fourier transform as a function of the wavenumber $F_k$ is calculated by:

$$F_k = \Im(f_i)_k = A_k + j*B_k, \quad j = \sqrt{-1} \quad (3)$$

where $\Im$ is the discrete Fourier transform as a function of frequency.

The phase ø, as a function of wavenumber, can be calculated by the relationship:

$$\phi_k = a\tan\left(-\frac{B_k}{A_k}\right) \quad (4)$$

The present invention bypasses the step of explicitly calculating the phase. The relationship between phase and wavenumber is shown in order to demonstrate the relationship of the phase to the desired value, which is the group delay.

The group delay is defined as the first derivative of the phase as a function of frequency. In the case of the discrete Fourier transform, the group delay is defined as the derivative of phase with respect to the wave number k. Therefore the group delay function can be defined as:

$$g_k = \frac{d}{dk} \phi_k = \frac{d}{dk}\left(a\tan\left(-\frac{B_k}{A_k}\right)\right) \quad (5)$$

which, upon calculating the differentiation converts to:

$$g_k = \frac{B_k * \frac{d}{dk} A_k - A_k \frac{d}{dk} B_k}{A_k^2 + B_k^2} \quad (6)$$

The expression for group delay in equation 6 has terms for the first derivative with respect to the wavenumber of the real coefficients and the imaginary coefficients calculated as a result of the first Fast Fourier transform. The first derivative functions of the first plurality of coefficient pairs can be calculated by the following relationships:

$$\frac{d}{dk} A_k = \frac{d}{dk}\left\{\frac{2}{N} * \sum_i f_i*\cos\left(\frac{2*\pi*k*i}{N}\right)\right\} \quad (7)$$

The expression of equation 7 can be rewritten as:

$$\frac{d}{dk} A_k = \frac{2}{N} * \sum_i f_i* \frac{d}{dk} \cos\left(\frac{2*\pi*k*i}{N}\right) \quad (8)$$

which upon differentiation becomes:

$$\frac{d}{dk} A_k = \frac{-4*\pi}{N^2} * \sum_i i*f_i*\sin\left(\frac{2*\pi*k*i}{N}\right) \quad (9)$$

Similarly for the imaginary coefficients:

$$\frac{d}{dk} B_k = \frac{d}{dk}\left\{\frac{2}{N} * \sum_i f_i*\sin\left(\frac{2*\pi*k*i}{N}\right)\right\} \quad (10)$$

$$\frac{d}{dk} B_k = \frac{2}{N} * \sum_i f_i* \frac{d}{dk} \sin\left(\frac{2*\pi*k*i}{N}\right) \quad (11)$$

$$\frac{d}{dk} B_k = \frac{4*\pi}{N^2} * \sum_i i*f_i*\cos\left(\frac{2*\pi*k*i}{N}\right) \quad (12)$$

Substituting equation 9 and equation 12 into equation yields the relationship:

$$g_k = \frac{B_k * \frac{-4*\pi}{N^2} * \sum_i i*f_i*\sin\left(\frac{2*\pi*k*i}{N}\right) - A_k * \frac{4*\pi}{N^2} * \sum_i i*f_i*\cos\left(\frac{2*\pi*k*i}{N}\right)}{A_k^2 + B_k^2} \quad (13)$$

Equation 13 can be rewritten more simply as:

$$g_k = \frac{-4*\pi}{N^2} * \quad (14)$$

$$\frac{B_k * \sum_i i*f_i*\sin\left(\frac{2*\pi*k*i}{N}\right) - A_k * \sum_i i*f_i*\cos\left(\frac{2*\pi*k*i}{N}\right)}{A_k^2 + B_k^2}$$

Equation 14 contains summation terms similar in form to the Fourier coefficient term definitions from equations 1 and 2. Using the definition of the Fourier coefficients defined in equations 1 and 2, it is then possible to calculate a second plurality of coefficient pairs representing the result of a second Fast Fourier transform on a second plurality of numbers. The second plurality of numbers is calculated by multiplying each number in the first plurality of numbers by the index value corresponding to each number. The real coefficients and the imaginary coefficients calculated as a result of the second Fast Fourier transform are defined as:

$$C_k = \frac{2}{N} \sum_i i*f_i*\cos\left(\frac{2*\pi*k*i}{N}\right) \tag{15}$$

$$D_k = \frac{2}{N} \sum_i i*f_i*\sin\left(\frac{2*\pi*k*i}{N}\right) \tag{16}$$

The second discrete Fourier transform can be calculated in a manner similar to that shown in equation 3:

$$H_k = \Im(i*f_i)_k = C_k + j*D_k \tag{17}$$

Equation 14, the expression for group delay, can therefore be rewritten as:

$$g_k = \frac{-2*\pi}{N} * \frac{A_k*C_k + B_k*D_k}{A_k^2 + B_k^2} \tag{18}$$

which is an explicit determination of the group delay calculated without computing the phase.

Because the discrete Fourier transform is defined as:

$$\Im(f_i)_k = A_k + j*B_k \tag{19}$$

and multiplication by the complex conjugate yields:

$$\Im(f_i)_k \Im(f_i)_k^* = A_k^2 + B_k^2 \tag{20}$$

which is the denominator of the second term in equation 18, wherein the superscript asterisk (*) equation 20 indicates the complex conjugate. From equations 17 and 19 it is known that the product of the first discrete Fourier transform and the complex conjugate of the second Fourier transform yields:

$$\Im(f_i)_k * \Im(i*f_i)_k^* = A_k*C_k + B_k*D_k + j*(A_k*D_k - B_k*C_k) \tag{21}$$

Therefore equation 18 can be rewritten as:

$$g_k = \frac{-2*\pi}{N} * \frac{\Im(f_i)_k * \Im(i*f_i)_k^*}{\Im(f_i)_k * \Im(f_i)_k^*}$$

Where the real component term is the numerator of the second term in equation 18. The group delay is the real part of the expression for $g_k$, which can be expressed as:

$$G_k = \frac{-2*\pi}{N} * \frac{\mathbb{R}(\Im(f_i)_k * \Im(i*f_i)_k^*)}{\Im(f_i)_k * \Im(f_i)_k^*} \tag{23}$$

Where $\mathbb{R}$ indicates the real part of the argument.

Calculation of the group delay can be performed by simultaneous Fast Fourier transforms of the first plurality of numbers and the second plurality of numbers to save calculation time.

Figure 5:
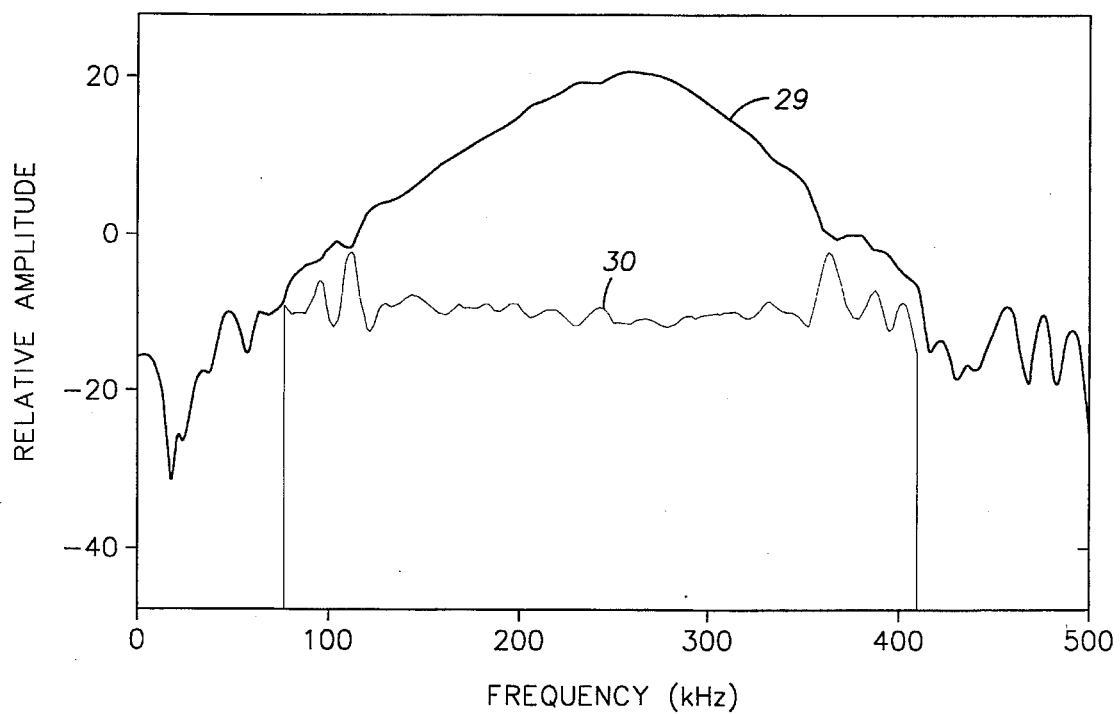
FIG. 5 is a graphic representation of the Fourier transform of amplitude as a function of frequency and group delay as a function of frequency for the reflection shown in FIG. 4.

After computation of the group delay function, the relative amplitudes of the reflection energy at various frequencies is evaluated to determine a frequency range in which there is sufficient energy in the reflection to evaluate the group delay curve. After the Fast Fourier transforms are completed, a third plurality of numbers is calculated from the first plurality of coefficient pairs, by calculating the square root of the sum of the squares of each of the first plurality of coefficient pairs. The third plurality of numbers represents the relative amplitudes of the component frequencies of the acoustic energy in the reflection. The third plurality of numbers is scanned over its entire range of frequencies, and a frequency at which a peak value of relative amplitude occurs is selected. The third plurality of numbers is then scanned for a lowest frequency and a highest frequency between which the relative amplitude remains greater than a preselected portion of the peak value. The portion selected in this embodiment of the invention was 4 percent of the peak value. In examination of several plots of amplitude as a function of frequency, an example of which is shown as number 29 in FIG. 5, at relative amplitudes above 4 percent of the peak value the reflection subjectively appeared to have a signal strength great enough to reliably perform the analysis of the group delay. The subjective criterion used to pick the 4 percent discrimination level was an appearance in the amplitude plot of a smooth roll-off of amplitude away from the transmitter center frequency of about 250 kHz. Below 4 percent of the peak amplitude, the plots had a "noisy" character or jagged appearance.

The real component of the complex group delay function, defined by the second plurality of coefficient pairs, is then scanned between the lowest frequency and the highest frequency. The maximum value found in the scan occurs at the resonant frequency of the casing, since there is a slight delay in the reflection time of energy at the resonant frequency of the casing, in particular because of the internal multiple reflections within the casing of energy at the resonant frequency of the casing. The group delay curve represents the first derivative of phase with respect to frequency, the slope of which derivative represents the time delay from the emission of the acoustic pulse to reception of the reflection. The group delay curve will tend to peak at disturbances in reflection time. An example of the real component of the group delay function is shown as number 30 in FIG. 5. The thickness of the casing can then be determined from the resonant frequency of the casing by the relationship (t=c/2*f), where t is the thickness of the casing, f is the resonant frequency, and c is the speed of sound in the casing. The factor of 2 is present because the energy has to cross the casing twice in order to return to the transducer.

DESCRIPTION OF PARTICULAR EMBODIMENTS

The quality of the calculation of the resonant frequency can be improved by addition of two optional process steps to the calculation. The first optional process step is called decimation. Decimation is performed on the first plurality of numbers, whereby the total quantity of numbers, or samples, in the first plurality of numbers is reduced by removing a predetermined quantity of samples from the plurality of numbers. Typically all but the n-th samples are removed from the plurality of numbers, where n is an integer from 2 to 10. Decimation is usually performed because the digitizing of signals by the tool is typically done at very high frequency to enable proper sampling of high frequency components of the signal.

Analysis of known lower frequency components is improved by decimation. The result is a plurality of numbers reduced in size by a factor of n, and an equivalent time interval between samples which is n times as large as the sample interval of the original plurality of numbers. Decimation reduces the maximum frequency calculable by the Fast Fourier transform, thereby reducing the computation required on the plurality of numbers. The second optional process step is known as zero-filling the data. The first plurality of numbers is extended, beyond the final sample digitized from the time-varying voltage analog of the reflection, with a quantity of samples, each with a value of zero, and at substantially the same spaced-apart time intervals as the digitized samples. The result of zerofilling the data in the first plurality of numbers is a reduction of the frequency increment calculated by the Fast Fourier transform (FFT). In effect the frequency resolution of the FFT is improved. Because the FFT calculation time is increased in proportion to the number of zero-value samples added, the actual number of zerovalue samples used to extend the first plurality of numbers should be limited to a number which limits the FFT calculation time to a few seconds. In the particular embodiment, the number chosen was a total of 4096 samples, of which 125 were data and the remainder were zero-fill values.

TEST RESULTS

In order to test the invention, several experiments were performed. A transducer similar to the transducer in the tool, having nominal peak-output frequency of 250 kHz was used to generate acoustic pulses in a test tank filled with water. Reflections from various thicknesses of casing were converted by the transducer into a time-varying electrical voltage. The time-varying electrical voltage was digitized with an 8-bit analog-to-digital converter having a constant 100 nanosecond time interval between each sample. One thousand samples comprised a first plurality of numbers representing the digitized reflection, the first plurality of numbers extending to represent a final acquisition time of 100 microseconds. The first plurality of numbers was then decimated by a factor of eight whereby all but every eighth number in the first plurality of numbers was removed from the first plurality of numbers, thereby reducing the first plurality of numbers to a quantity of 125, having the equivalent of a constant 800 nanosecond time interval per sample. The decimated first plurality of numbers was then extended to a quantity of 4096 samples by adding additional samples, each with a value of zero, to the end of the first plurality of numbers. The purpose of the decimation is to reduce the maximum frequency calculable by the first Fourier transform. The extension of the first plurality of numbers with zeroes increases the frequency resolution of the first Fourier transform. The decimation process had no adverse effects because the first plurality of numbers was digitized at a much higher frequency than the frequency of the acoustic energy content of the reflection.

Figure 4:
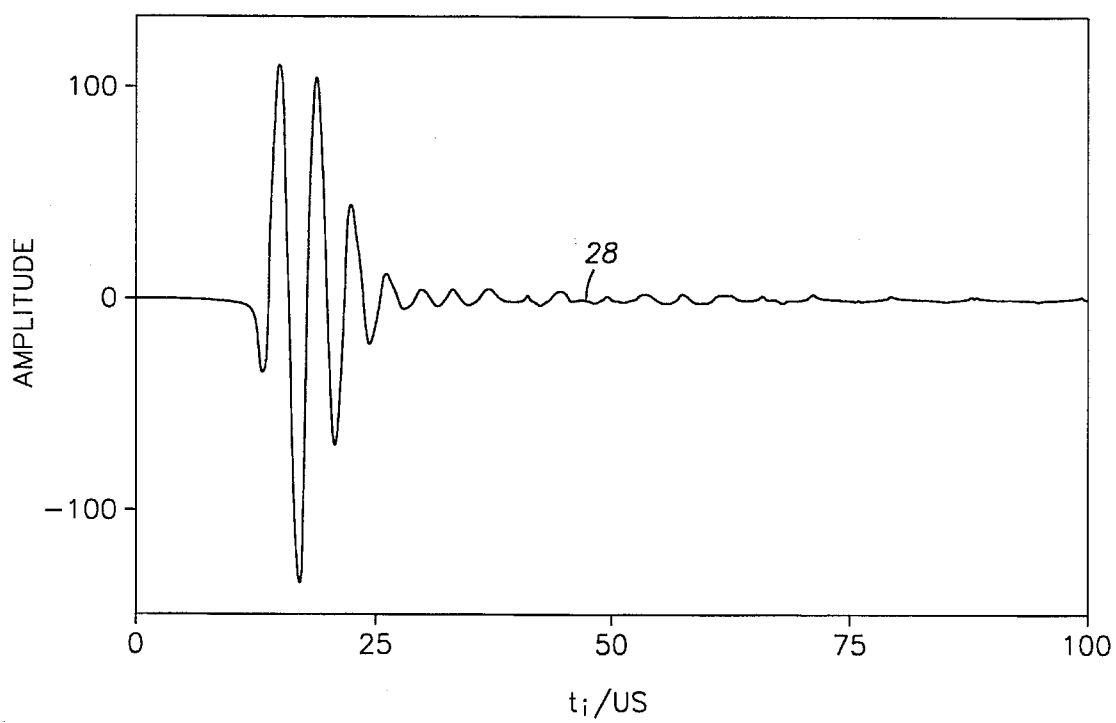
FIG. 4 is a graphic representation of the time-varying electrical voltage from the transducer generated by the reflection of a steel plate.

FIG. 4 shows a graphic representation 28 of the transducer response to a reflection from a 24.892 millimeter (mm) thick steel plate. The Fourier transform 29 and group delay 30 shown in FIG. 5 were calculated by the method of the invention. The casing resonance occurs at about 111 kilohertz (kHz), which with a speed of sound of 5531 meters per second calculates a casing thickness of 24.892± 0.003 mm. The tolerance described in the thickness measurement is a function of the limitation in the accuracy with which the resonant frequency of the casing can be determined from the group delay.

In this experiment the plate thicknesses were known, and the speed of sound in the plate was unknown, so that for this experiment, it was actually the speed of sound which was determined, rather than the thickness of the plate. As stated earlier, the relationship between thickness and resonant frequency is:

$$t = \frac{c}{2*f} \tag{24}$$

where t is the thickness of the casing, c is the speed of sound in the casing, and f is the resonant frequency.

Figure 6:
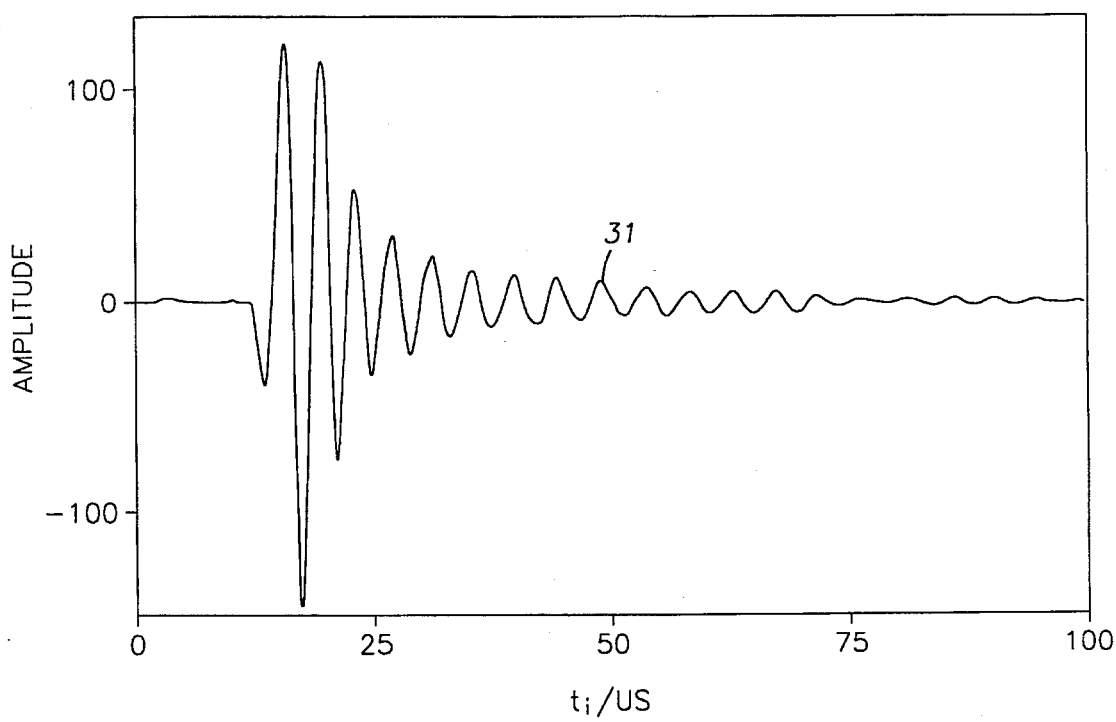
FIG. 6 shows a reflection from a steel plate thinner than the steel plate of FIG. 4.
Figure 7:
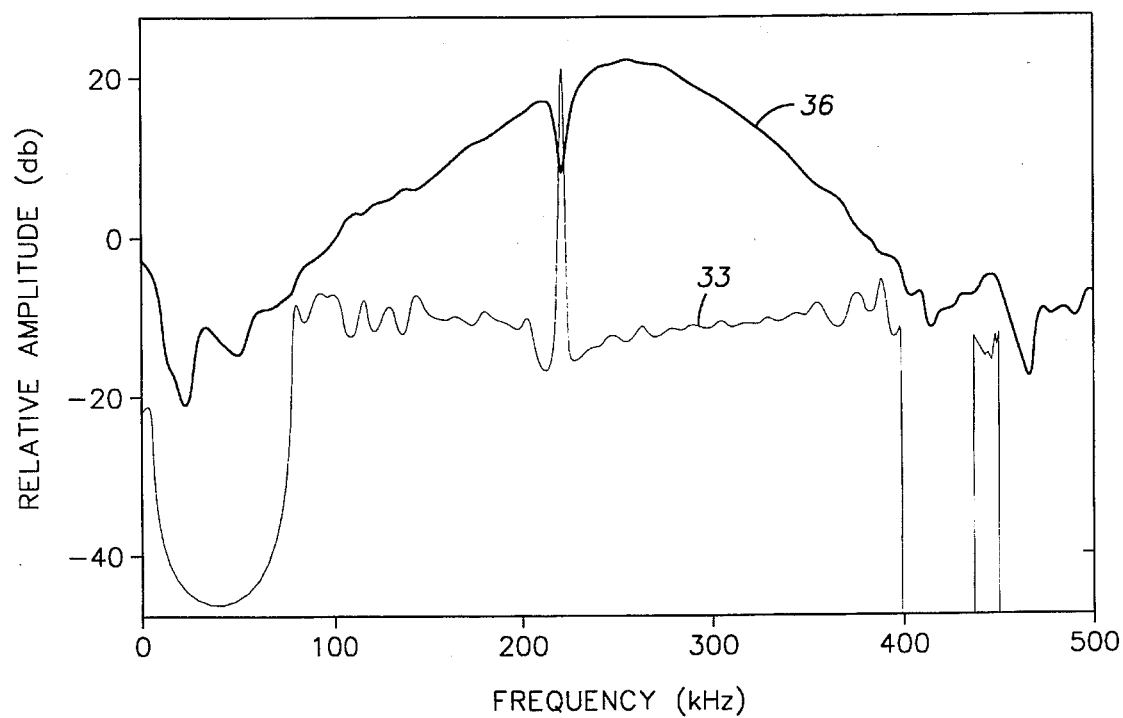
FIG. 7 shows the Fourier transform and group delay plots for the reflection shown in FIG. 6.

FIG. 6 shows a representation 31 of a reflection from 12.903 mm thick steel plate. FIG. 7 shows the Fourier transform 36 and the group delay 33 computed from the amplitudes illustrated in FIG. 6. The casing resonance was determined to be at about 219 kHz. A speed of sound of 5656 meters per second in the casing calculates a casing thickness of 12.903± 0.0007 mm.

I claim:

1. A method for determining the thickness of a casing installed in a wellbore penetrating an earth formation from a reflection signal generated by an acoustic pulse-echo imaging tool deployed within said casing, said method comprising the steps of:

a) calculating a first plurality of Fourier coefficient pairs from a first plurality of numbers representing digitized amplitudes of said reflection signal;

b) calculating a second plurality of Fourier coefficient pairs from a second plurality of numbers representing modified digitized amplitudes of said reflection signal, said modified digitized amplitudes being calculated by multiplying each said digitized amplitude in said first plurality of numbers by an index number representing the ordinal position of each said digitized amplitude in said first plurality of numbers;

c) calculating a group delay function from said first plurality of Fourier coefficient pairs and said second plurality of Fourier coefficient pairs and determining a maximum value within said group delay function;

d) determining a frequency at which said group delay function reaches said maximum value; and e) calculating the thickness of said casing from said frequency.

2. A method of determining the thickness of a casing installed in a wellbore penetrating an earth formation comprising the steps of:

a) lowering an acoustic pulse-echo imaging tool into said wellbore, said acoustic pulse-echo imaging tool comprising an acoustic transducer;

b) causing said acoustic transducer to emit an acoustic energy pulse whereby said casing and said wellbore become acoustically energized;

c) causing said acoustic transducer to receive an at least partial reflection of said acoustic energy pulse from said casing and said wellbore and causing said acoustic transducer to generate an electrical analog of said at least partial reflection;

d) digitizing said electrical analog whereby a first plurality of numbers is generated, each number of said plurality of numbers representing an amplitude of said electrical analog sampled at spaced-apart time intervals and having an index value representing an ordinal position of each number in said first plurality of numbers;

e) calculating a first Fourier transform whereby said first plurality of numbers is used to generate a first plurality of Fourier coefficient pairs comprising real coefficients and imaginary coefficients resulting from calculating said first Fourier transform;

f) calculating a second plurality of numbers by multiplying each number of said first plurality of numbers by said index value which represents said ordinal position of each number in said first plurality of numbers;

g) calculating a third plurality of numbers representing magnitudes of a combination of said real coefficients and said imaginary coefficients from said first Fourier coefficient series, said magnitudes sampled as a function of frequency;

h) calculating a second Fourier transform whereby said third plurality of numbers is used to generate a second plurality of Fourier coefficient pairs representing real coefficients and imaginary coefficients resulting from calculating said second Fourier transform;

i) calculating a third plurality of coefficient pairs representing a complex group delay series comprising real components sampled as a function of frequency and imaginary components sampled as a function of frequency, whereby said third plurality of coefficient pairs is calculated from said first plurality of Fourier coefficient pairs and said second plurality of Fourier coefficient pairs;

j) searching said second plurality of numbers and determining a first frequency at which a peak value occurs, and selecting a lowest frequency and a highest frequency between which said magnitude remains above a predetermined portion of said peak value;

k) searching said real components of said third plurality of coefficient pairs between said lowest frequency and said highest frequency and determining a second frequency at which a maximum value occurs; and l) calculating the thickness of said casing from said second frequency whereby said second frequency is determined to be a resonant frequency of said casing.

3. The method as defined in claim 2 further comprising the step of decimating said first plurality of numbers prior to calculating said first Fourier Transform so as to increase a sampling time interval between each number in said first plurality of numbers, whereby the maximum frequency calculable by said first Fourier transform and said second Fourier transform is reduced.

4. The method as defined in claim 2 further comprising the step of sequentially extending said first plurality of numbers with a fourth plurality of numbers, each number in said fourth plurality of numbers having a value of zero, prior to calculating said first Fourier transform, whereby the frequency resolution of said first Fourier transform and said second Fourier transform is increased.

* * * * *